Jan. 21, 1936. S. S. COOK ET AL 2,028,500

POWER TRANSMISSION COUPLING

Filed June 2, 1934  2 Sheets-Sheet 2

INVENTORS
Stanley Smith Cook
and Louis Mortimer Douglas
BY
Philip Sawyer Rice Kennedy
ATTORNEYS Patented Jan. 21, 1936

2,028,500

UNITED STATES PATENT OFFICE 2,028,500

POWER-TRANSMISSION COUPLING

Stanley Smith Cook and Louis Mortimer Douglas, Wallsend-on-Tyne, England, assignors to The Parsons Marine Steam Turbine Company, Limited, Wallsend-on-Tyne, England Application June 2, 1934, Serial No. 728,664
In Great Britain June 8, 1933

7 Claims. (Cl. 192—41)

The invention relates to power-transmission couplings suitable for shafts and particularly to cases in which it is necessary to provide for a certain amount of flexibility in case of a want of alignment between the driving and driven members.

Examples of couplings suitable for the purpose indicated comprise an intermediate coupling member with dogs or claws which engage with corresponding dogs or claws on the two shafts to be coupled.

In order that the claw coupling may perform its work satisfactorily, it has necessarily to be of considerable length to reduce the tilt to which it is subjected by want of alignment, and if such a coupling and also a unidirectional clutch are used in the same length of shafting, a considerable amount of space is occupied in the axial direction.

A main object of the present invention is to render such an arrangement more compact.

With such an object, the invention consists in a power-transmission coupling comprising the combinations of elements hereinafter described and particularly pointed out in the claims.

Referring to the accompanying drawings:—

Figure 1:
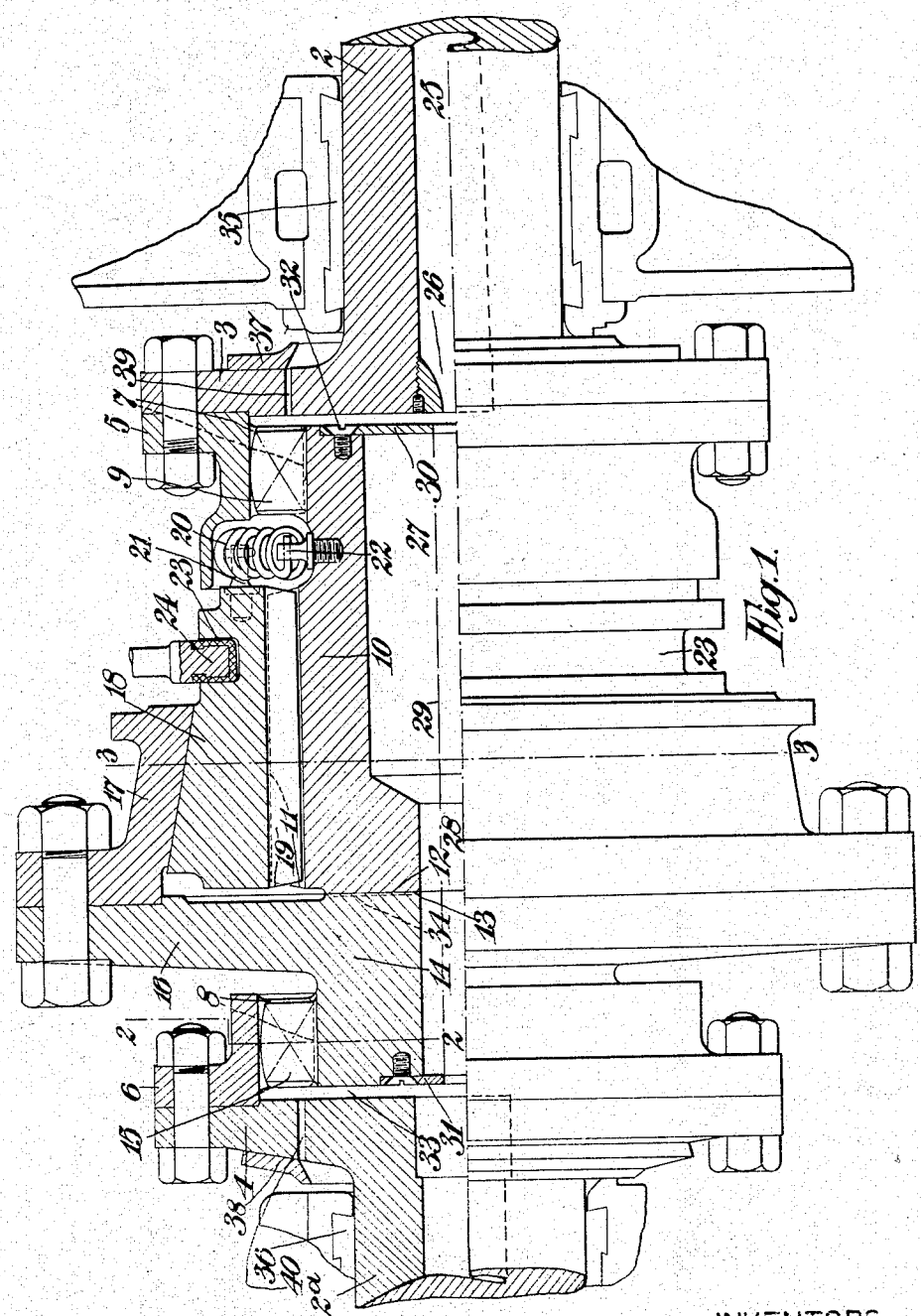
Figure 1 shows a longitudinal elevation, in section as regards its upper half, of one form of coupling according to the present invention.
Figure 2:
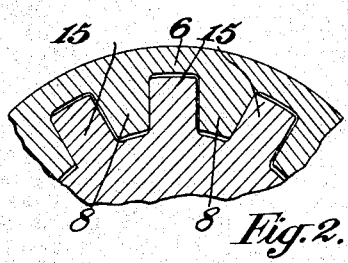
Figure 2 shows a corresponding section on the line 2—2 of Figure 1.
Figure 3:
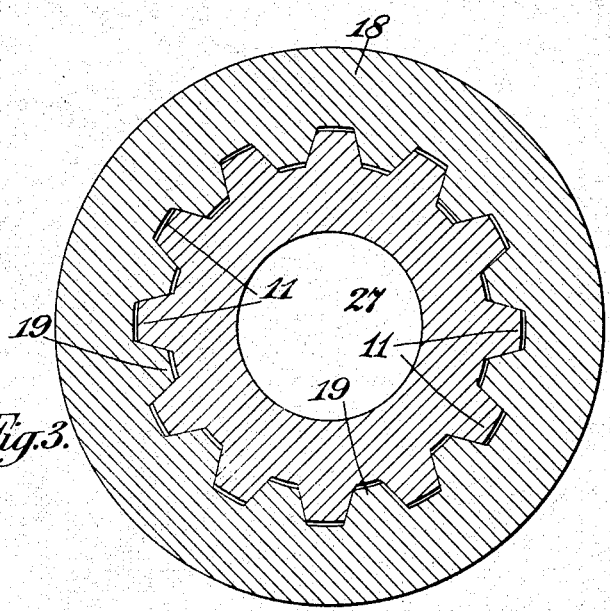

Figure 3 a section on the line 3—3 of Figure 1; while

Figure 4:
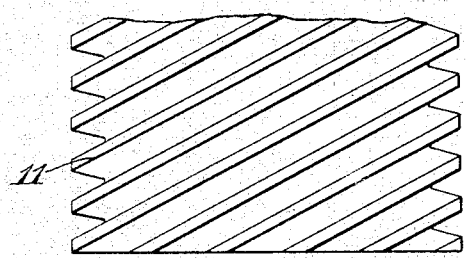

Figure 4 shows a plan view of part of the intermediate coupling member removed from the assembly.

In carrying the invention into effect according to the form illustrated applied to aligned driving and driven shafts, 2 and 2a, the adjacent ends of these shafts are provided with flanges, 3, 4, and an annular angle, 5, 6, or the like is bolted to the periphery of each flange, 3, 4, carrying a set of dogs or claw teeth, 7, 8, on its inner circumference. The dogs, 7, associated with the driving member, 2, engage with corresponding dogs, 9, on an intermediate length of shaft, 10, provided at the end remote from the dogs, 7, with an annular set of helical teeth, 11, (see Figure 4) and a plane abutment surface, 12, which engages with a like surface, 13, on a second length of shaft, 14, provided with dogs or claws, 15, engaging with the complementary set, 8, secured to the driven member, 2a.

The shaft, 14, is provided with an outstanding flange, 16, to which is bolted near its periphery an annular element, 17, coned internally to engage with an externally-coned annular nut, 18, provided on its inner surface with helical teeth, 19, engaging with the teeth, 11, above mentioned.

A suitable device is provided for moving the nut, 18, into operative engagement with the surrounding cone, 17, and for this purpose, light springs, 20, are conveniently arranged between the nut, 18, itself and the intermediate shaft, 10, the ends of each spring, 20, being connected to pins 21, 22, screwed into the parts between which it acts.

In the example of the invention illustrated, an annular groove, 23, is formed on the nut, 18, to accommodate a member, 24, disposed therein, this member being operable by any suitable means.

In the example described, it will be seen that the two lengths of shafting, 10 and 14, the coned nut, 18, and the internally-coned element, 17, are in effect self-aligning and together constitute the body of the intermediate coupling member.

In operation, the driving shaft, 2, transmits torque by way of its own set of dogs, 7, to the intermediate length of shaft, 10, carrying the helical teeth, 11, which are so arranged that by coaction with the similar teeth, 19, on the floating nut, 18, the latter is moved axially to engage with the surrounding coned element, 17, bolted to the second intermediate shaft, 14.

In the circumstances described, when the driving shaft, 2, transmits torque to the driven shaft, 2a, the butting of the surfaces, 12, 13, on the intermediate coupling members, 10, 14, provides the necessary reaction for bringing the coned nut, 18, into operation.

If the direction of rotation of the shaft, 2, is reversed, then, owing to the engagement of the helical teeth, 11, 19, the coned nut, 18, is moved axially in the opposite direction so that the clutch, of which it forms part, can operate as a free-wheel, that is to say it can rotate freely without transmitting torque.

Lubrication of the various parts may be effected in any suitable way. For instance, in the example illustrated, lubricating oil is introduced into the centre of the coupling through an axial hole, 25, in the driving shaft, 2, whence it passes through the nozzle-like discharge, 26, into the axial holes, 27, 28, in the intermediate lengths of shaft, 10, 14. In this space, the oil is retained by centrifugal force at a radial level, 29, determined by the inner edges of apertured plates, 30, 31, secured to the intermediate shafts, 10, 14, the overflow passing outwards through spaces, 32, 33, to the dogs, 7, 9, and 8, 15, respectively, and through radial ducts, 34, to the conical surfaces on the elements, 17, 18, and to the screw threads 11, 19. Oil from the bearings, 35, 36, may also be passed by annular deflectors, 37, 38, through ducts, 39, 40, to the dogs, 7, 9, and 8, 15, respectively.

It will be understood that while one form of coupling has been described in considerable detail, the invention is not confined to the particular type of flexible coupling nor to the particular type of unidirectional clutch, and that many variations from the particular constructions described may be made without exceeding the scope of the invention.

We claim:

1. A power-transmission device comprising, in combination, a driving and a driven element subject to misalignment, each of said elements being provided with a set of dogs and an interposed coupling device in power-transmitting relation with said driving and driven elements and tiltable in relation thereto to accommodate said misalignment, said coupling device including co-axially-juxtaposed end members carrying sets of dogs engaging respectively with said sets of dogs on said driving and driven elements and including also an intermediate member in screw-threaded relation to one of said dog-carrying members and engageable in driving association with the other of said dog-carrying members.

2. A power-transmission device as claimed in claim 1, in which said dog-carrying elements carry said dogs on parts of said elements remote from one another and are provided with butting surfaces on adjacent parts.

3. A power-transmission device as claimed in claim 1, in which said dog-carrying elements are provided with axial hollows and at least one of said driving and driven members is also provided with an axial hollow having a nozzle-like discharge to said axial hollows of said dog-carrying elements.

4. A power-transmission device as claimed in claim 1, in which said dog-carrying elements are provided with axial hollows, in which an annulus of lubricant is held by centrifugal force, said axial hollows having annular end members to determine the radial level at which said annulus of lubricant is so held.

5. A power-transmission device as claimed in claim 1, in which said intermediate member is provided with an internal screw-thread of quick pitch engaging with a corresponding thread on one of said dog-carrying members and a cone-clutch surface engaging with a corresponding surface on said other of said dog-carrying members and is provided also with operating means in rotational relation to said intermediate member for moving said intermediate member axially.

6. A power-transmission device as claimed in claim 1, in which said set of dogs on said driving and driven members and on said dog-carrying members of said coupling device run one set radially outwards and the co-acting set radially inwards.

7. A power-transmission device as claimed in claim 1, in which said sets of dogs on said driving and driven members and on said dog-carrying members of said coupling device run one set radially outwards and the co-acting set radially inwards, the free ends of said dogs being in contact with the co-acting parts and being curved to permit tilting movement of said coupling device to accommodate change of alignment of said driving and driven elements.

STANLEY SMITH COOK.
LOUIS MORTIMER DOUGLAS.